(12) United States Patent
Abadel et al.

(10) Patent No.: US 12,404,212 B1
(45) Date of Patent: Sep. 2, 2025

(54) WIRE MESH CONCRETE REINFORCEMENT MEMBERS AND METHODS OF USE THEREOF

(71) Applicant: King Saud University, Riyadh (SA)

(72) Inventors: Aref A. Abadel, Riyadh (SA); Husain Sayyed Abbas, Riyadh (SA); Tarek H. Amusallam, Riyadh (SA); Yousef Abdullah Alsalloum, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/001,992

(22) Filed: Dec. 26, 2024

Related U.S. Application Data

(62) Division of application No. 18/776,876, filed on Jul. 18, 2024, now Pat. No. 12,227,454.

(51) Int. Cl.
| | |
|---|---|
| C04B 14/48 | (2006.01) |
| C04B 28/04 | (2006.01) |
| E04C 5/07 | (2006.01) |
| B28B 23/02 | (2006.01) |

(52) U.S. Cl.
CPC .............. *C04B 14/48* (2013.01); *C04B 28/04* (2013.01); *E04C 5/073* (2013.01); *B28B 23/02* (2013.01)

(58) Field of Classification Search
CPC .......... E04C 5/012; E04C 5/04; E04C 5/0622; E04C 5/0627; E04C 5/0636; E04C 5/064; E04C 5/07

See application file for complete search history.

(56) References Cited

U.S. PATENT DOCUMENTS

| | | | |
|---|---|---|---|
| 1,349,868 A | | 8/1920 | Grosvenor |
| 1,531,224 A | * | 3/1925 | Rogers ...................... E04C 2/42 52/660 |
| 2,677,955 A | | 5/1954 | George |
| 3,400,507 A | | 9/1968 | Macchesney |
| 3,475,876 A | * | 11/1969 | Oroschakoff ......... E04C 5/0622 52/669 |

(Continued)

FOREIGN PATENT DOCUMENTS

| | | |
|---|---|---|
| GB | 2180275 A | 3/1987 |
| WO | 2007137384 A1 | 12/2007 |
| WO | 2008095211 A1 | 8/2008 |

*Primary Examiner* — Seth Dumbris
(74) *Attorney, Agent, or Firm* — Nath, Goldberg & Meyer; Joshua B. Goldberg

(57) ABSTRACT

A fiber reinforced concrete includes a plurality of reinforcing wire meshes scattered and suspended in random orientation throughout the volume of concrete. The reinforcing wire meshes include a first set of two or more parallel wires extending along their length in a common plane and a second set of three parallel wires orthogonal to the first set along their length in a common plane. The first set and second set constitute an entire reinforcing member. The wire meshes may be formed by casting or welding in which the wires lie in a common plane or separate planes, respectively. The reinforcing members may have a total of two or four contiguous rectangles arranged in a mesh pattern. Free ends of the reinforcing members may be included and extend beyond the mesh pattern for increased anchorage. A method of reinforcing concrete is disclosed and may include a central or diagonal bend in the reinforcing members.

2 Claims, 8 Drawing Sheets

(56) References Cited

U.S. PATENT DOCUMENTS

| | | | |
|---|---|---|---|
| 3,913,295 A | 10/1975 | Thompson | |
| 4,539,787 A * | 9/1985 | Ritter | E04C 5/04 |
| | | | 52/600 |
| 4,960,649 A | 10/1990 | Takata et al. | |
| 5,106,227 A * | 4/1992 | Ahmad | E01C 11/005 |
| | | | 404/70 |
| 5,404,688 A | 4/1995 | Greaves | |
| 5,836,715 A | 11/1998 | Hendrix et al. | |
| 6,263,629 B1 | 7/2001 | Brown | |
| 6,305,432 B1 * | 10/2001 | Sacks | B21F 27/10 |
| | | | 404/70 |
| 6,705,055 B2 * | 3/2004 | Ritter | E04C 2/049 |
| | | | 52/410 |
| 6,706,380 B2 | 3/2004 | Edwards et al. | |
| 9,663,950 B2 * | 5/2017 | Karle | B29C 70/28 |
| 11,346,100 B1 * | 5/2022 | Blackburn | E04G 11/08 |
| 11,466,456 B2 | 10/2022 | Kim et al. | |
| 2005/0138877 A1 * | 6/2005 | Inoue | E04B 5/328 |
| | | | 52/414 |
| 2011/0101266 A1 | 5/2011 | Thomas et al. | |
| 2013/0205687 A1 * | 8/2013 | Sala | E04B 1/38 |
| | | | 428/190 |
| 2013/0216851 A1 * | 8/2013 | Stahl | B21H 8/005 |
| | | | 225/2 |

* cited by examiner

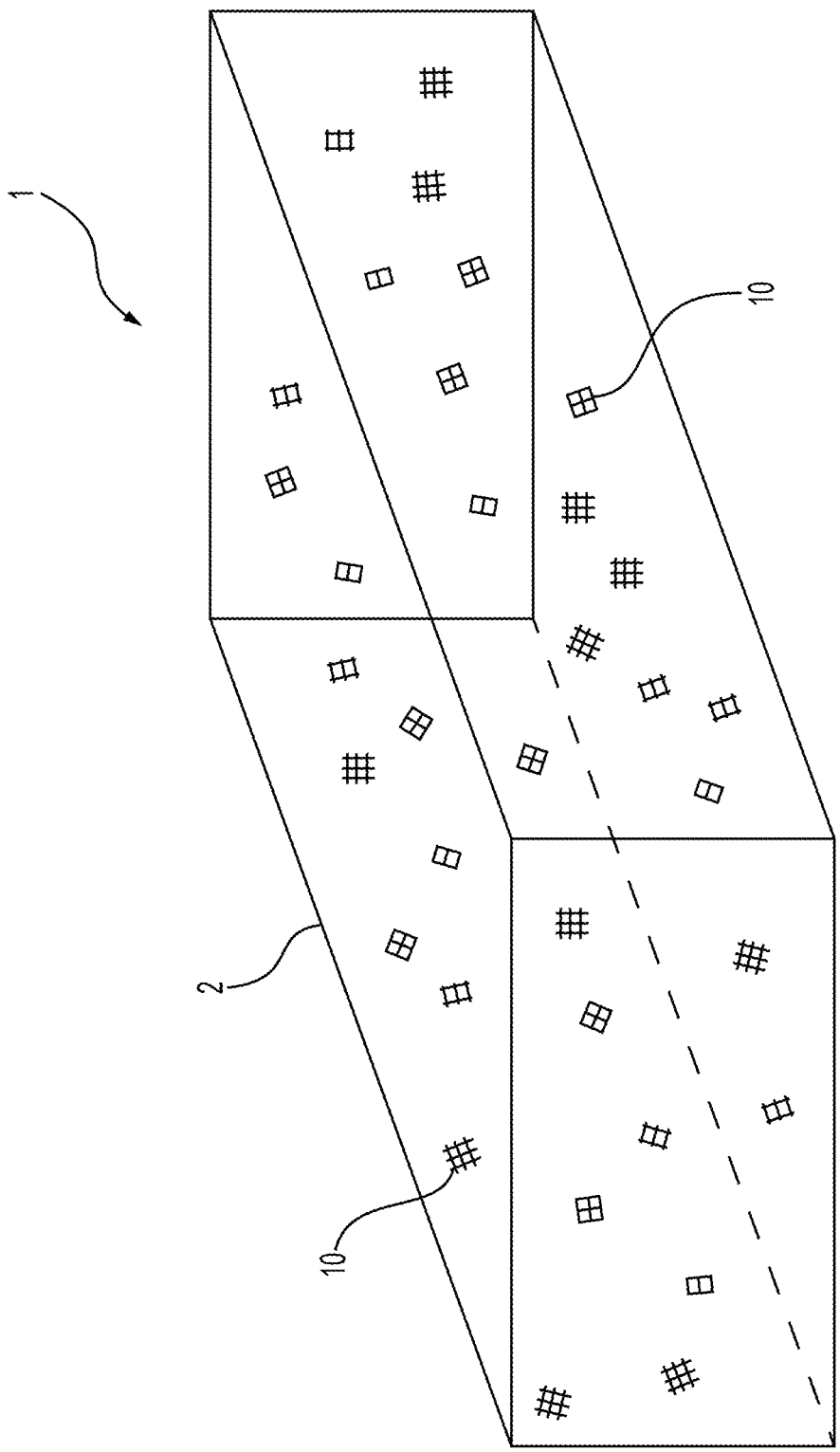

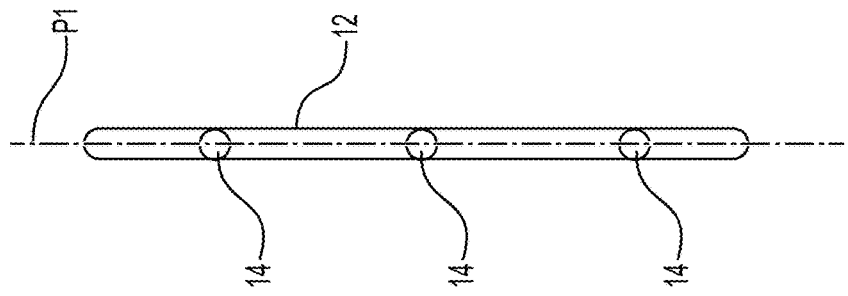
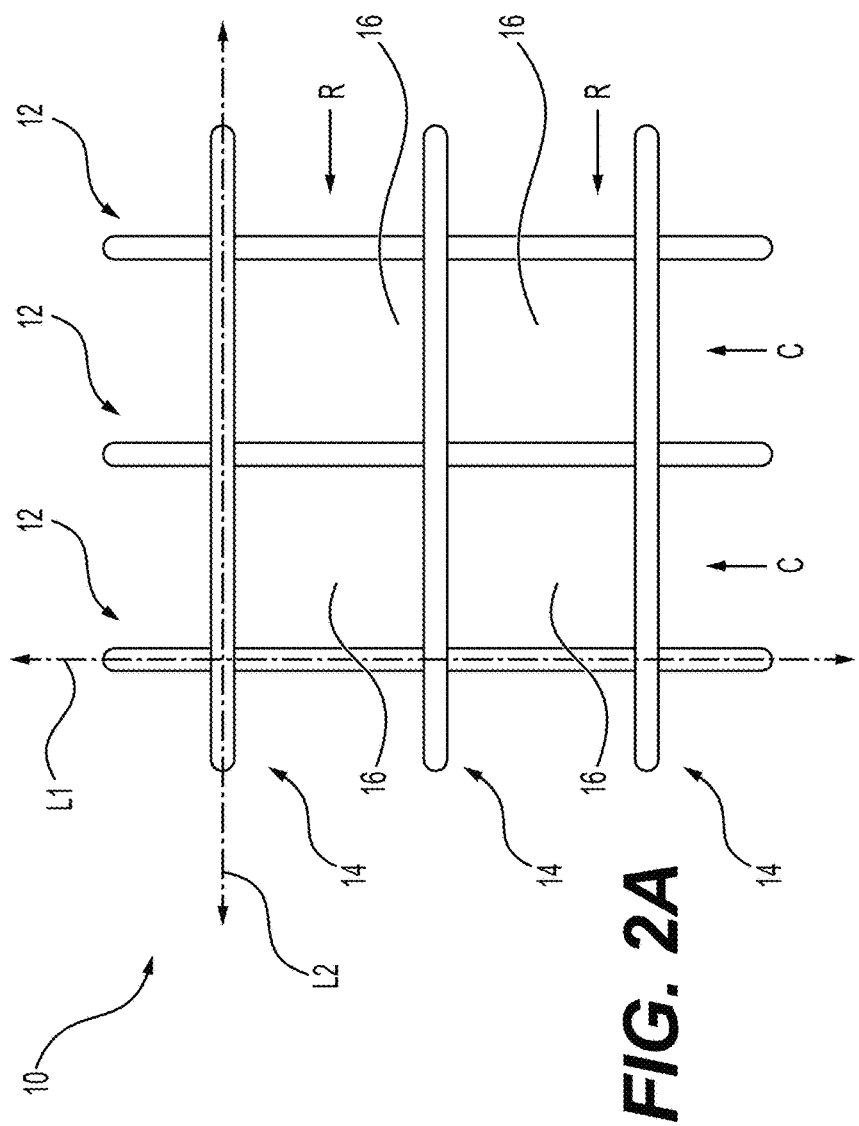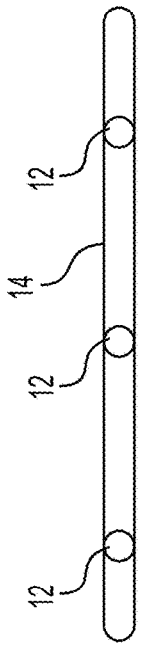

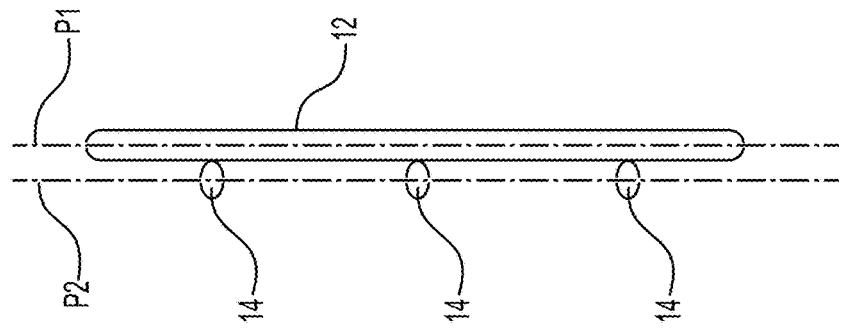
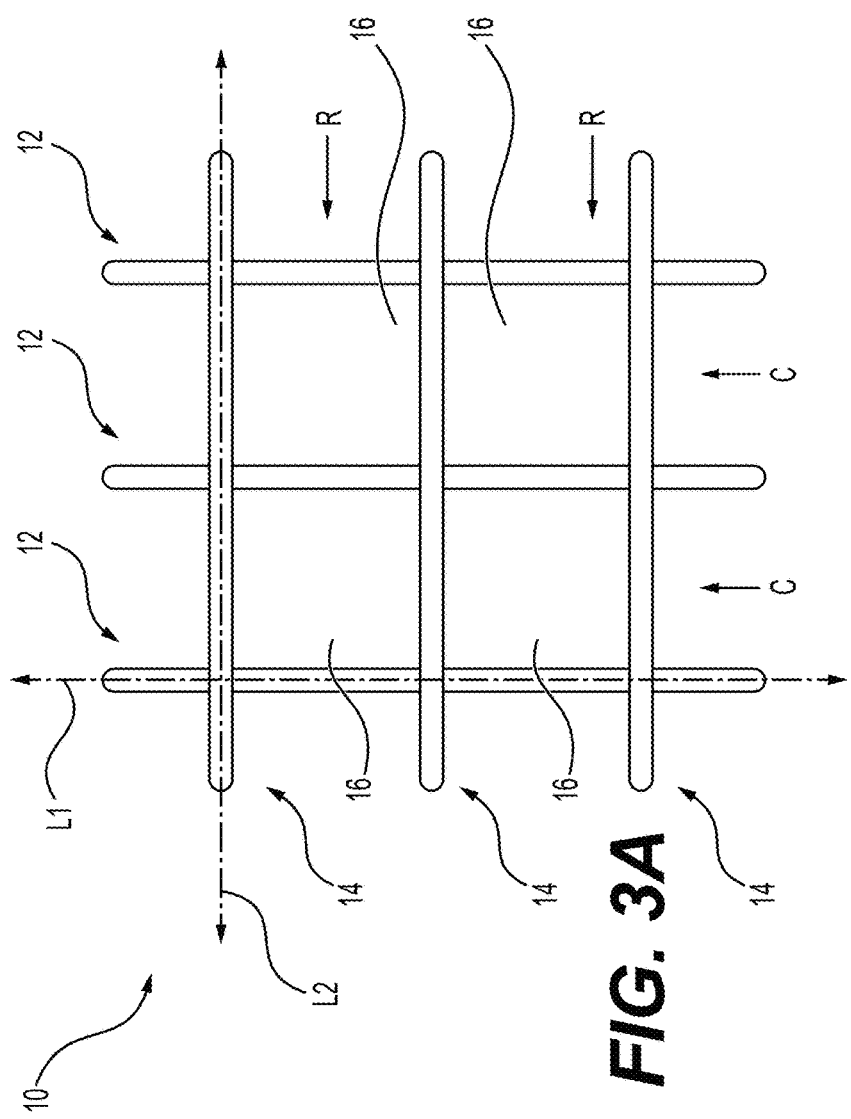
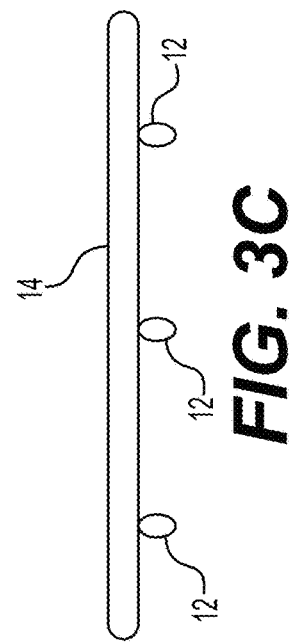

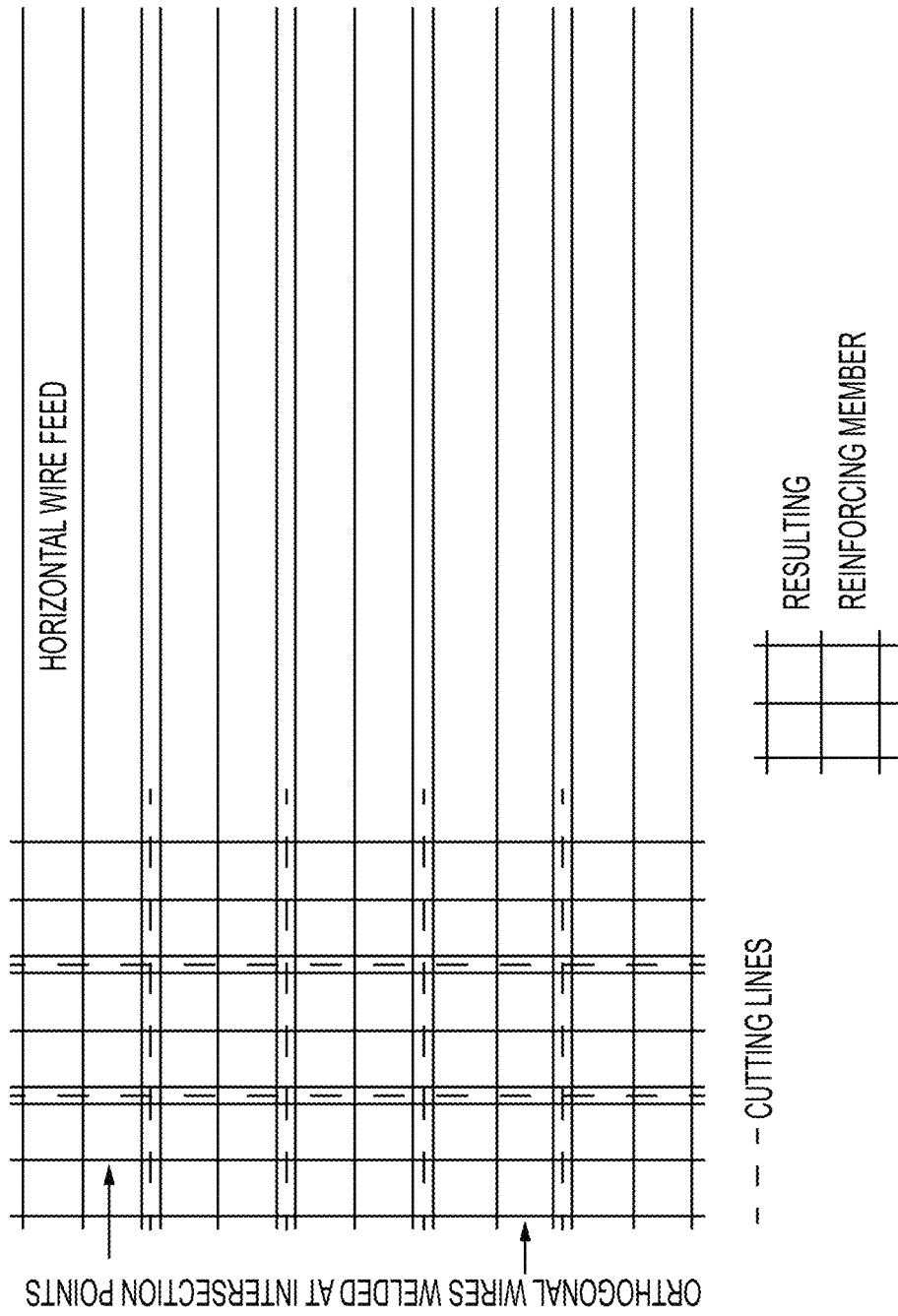

WIRE MESH CONCRETE REINFORCEMENT MEMBERS AND METHODS OF USE THEREOF

CROSS-REFERENCE TO RELATED APPLICATION

This application is a divisional of U.S. patent application Ser. No. 18/776,876, filed on Jul. 18, 2024, the entire contents of which are incorporated herein by reference.

BACKGROUND

Field

The disclosure of the present patent application relates to concrete reinforcement, and particularly to concrete reinforcement using a plurality of discrete rectangular wire meshes distributed in a volume of concrete.

Description of Related Art

Concrete is a popular construction material, but it is weak in resisting tensile stresses and, hence, possesses low fracture toughness. For these reasons, concrete is reinforced with steel rebars to resist tensile stresses. For stress to develop in steel rebars of reinforced concrete, concrete has to crack, and thus cracking is unavoidable in rebar reinforced concrete. Steel fibers are sometimes added to concrete to improve cracking resistance and fracture toughness of the concrete, thus producing fiber-reinforced concrete (FRC). FRC has also been used to improve structural strength and reduce crack widths, thus improving durability, impact, abrasion, and freeze-thaw resistance of the FRC.

Deformed fibers of uniform corrugations along their entire length, such as filiform or thread-like fibers, sinusoidal fibers, bi-tapered fibers, fibers with waveform ribs, three-dimensional twisted fibers, multi-leg fibers, etc., have been used for the development of better bonds between fibers and concrete, but most of these fibers require special equipment and skilled labor for their manufacture. Coated fibers have also been used to improve the bond between fibers and the surrounding concrete. A new fiber type developed initially for soil stabilization has also been used for producing FRC to provide a mix of stiff and flexible fibers.

The previous fibers used to produce FRC have been mostly straight fibers with either hooked ends or a surface profile to improve the bond between the fibers and concrete. Such fibers provide resistance to concrete cracking when the cracks are close to their mid-length, and these fibers offer no resistance to cracks crossing the fibers close to their ends. Moreover, it is difficult to ensure the orientation of fibers in different directions. Thus, the efficiency of concrete reinforcement fibers may be improved upon and there is a need for appropriate and convenient types of fibers that improve the distribution and orientation of fibers in producing fiber reinforced concrete with desirable characteristics.

SUMMARY

The present disclosure is directed towards a fiber reinforced concrete including a volume of concrete and a plurality of discrete reinforcing members scattered randomly and suspended throughout the volume of concrete. The discrete reinforcing members are wire meshes including a first set of two or more parallel wires extending along their length in a common plane and a second set of three parallel wires extending along their length in a common plane. The first set and second sets of parallel wires are orthogonal to each other and constitute an entire reinforcing member. The wire meshes may be formed by casting in which the first and second set of wires extend along their respective lengths in a shared common plane. The wire meshes may be formed by welding where the first set of wires extend along their length in a first common plane and the second set of wires extend along their length in a second common plane.

The fiber reinforced concrete may include reinforcing members having a mesh pattern including a total of two contiguous rectangles arranged in a single row or column. In addition, the reinforcing members may include a mesh pattern of a total of four contiguous rectangles arranged in two rows and two columns.

The fiber reinforced concrete may include reinforcing members having a mesh pattern of rectangles wherein wires of the first set or second set forming the mesh pattern include free ends extending laterally outward beyond the mesh pattern. The reinforcing members of the fiber reinforced concrete may include wires having a diameter of between about 0.2 mm and about 3 mm. In particular, the wires may have a diameter of between about 0.2 mm and about 2 mm. An overall length of the wire meshes forming the reinforcing members may be about 10 mm to about 75 mm and an overall width of the wire meshes may be about 10 mm to about 75 mm. The wires of the reinforcing members may have a cross-section which is circular or polygonal.

The present disclosure is further directed to a method of reinforcing concrete including forming a plurality of reinforcing members in which the reinforcing members are wire meshes. The wire meshes include a first set of two or more parallel wires extending along their length in a common plane and a second set of three parallel wires extending along their length in a common plane. The first set and second set of wires are orthogonal to each other and constitute an entire reinforcing member. The method includes scattering the reinforcing members within a volume of concrete such that the reinforcing members are suspended in random orientations throughout the volume of concrete. The method may include bending the first set of wires along a central wire member of the second set of wires. The method of reinforcing concrete may include bending the reinforcing members about a line extending through diagonally opposed corners formed in a perimeter of the reinforcing members.

Further disclosed herein is a concrete reinforcing member. The concrete reinforcing member includes a wire mesh having a first set of two or more parallel wires extending along their length in a common plane and a second set of three parallel wires extending along their length in a common plane. The first set of wires and second set of wires are orthogonal to each other and constitute the entire reinforcing member. A diameter of the wires in the wire mesh is about 0.2 mm to about 3 mm. An overall length of the wire mesh is about 10 mm to about 75 mm, and an overall width of the wire mesh is about 10 mm to about 75 mm.

The concrete reinforcing member may include a wire mesh pattern of rectangles and include free ends extending beyond the mesh pattern. A cross-section of the wires used in the wire mesh may be circular or polygonal, and the wires used in the wire mesh may be crimped or may have other profiles such as sinusoidal.

These and other features of the present subject matter will become readily apparent upon further review of the following specification.

BRIEF DESCRIPTION OF DRAWINGS

FIG. 1 is a perspective view of a fiber reinforced concrete including a plurality of reinforcing members.

FIG. 2A is a top view of a reinforcing member formed by casting.

FIG. 2B is a right-side view of a reinforcing member formed by casting.

FIG. 2C is a front side view of a reinforcing member formed by casting.

FIG. 3A is a top view of a reinforcing member formed by welding.

FIG. 3B is a right-side view of a reinforcing member formed by welding.

FIG. 3C is a front side view of a reinforcing member formed by welding.

FIG. 3D is an example welding procedure for forming a 2×2 wire mesh reinforcing member.

Similar reference characters denote corresponding features consistently throughout the attached drawings.

DETAILED DESCRIPTION

Definitions

Figure 4A:
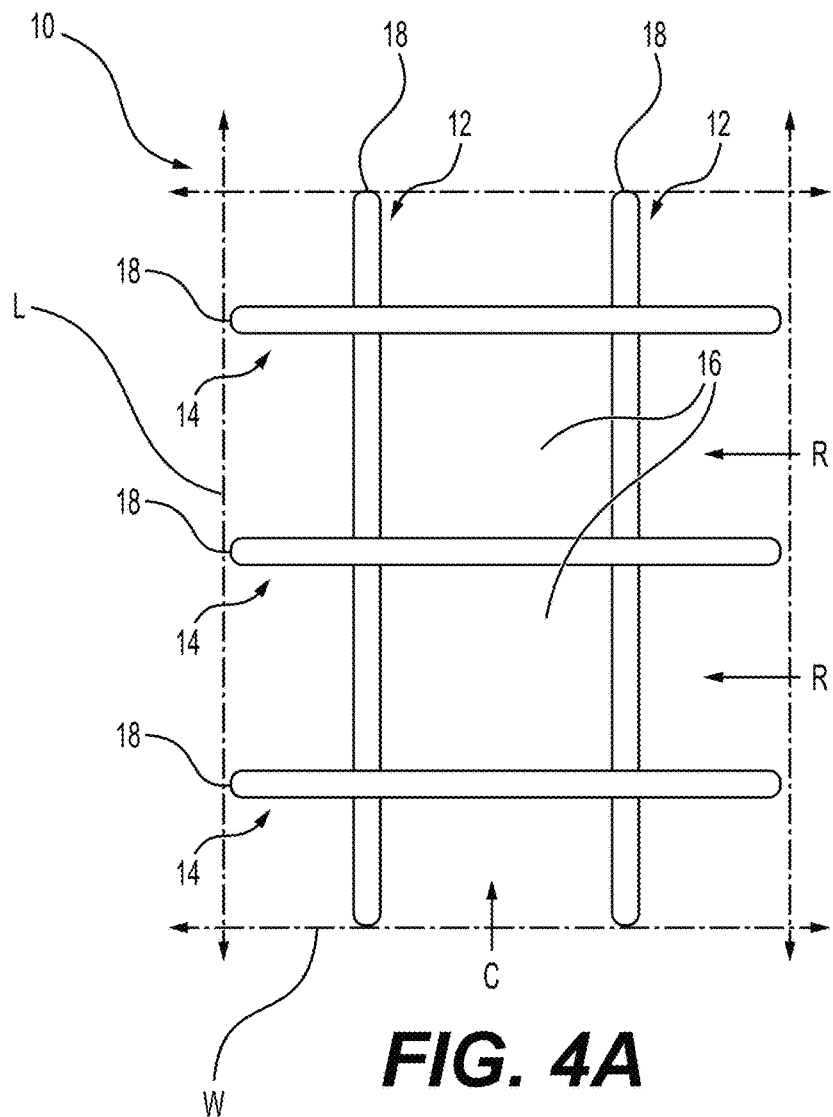
FIG. 4A is a top view of a 2×1 reinforcing member.

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present disclosure is directed towards a fiber reinforced concrete. As used herein, the terms 'fiber', 'filament', and 'wire' may be used interchangeably to indicate a slender filament used to form a reinforcing member.

Referring to FIG. 1, a fiber reinforced concrete 1 is shown including a volume 2 of concrete and a plurality of discrete reinforcing members 10 scattered in random orientations and suspended throughout the volume 2 of concrete. As shown in FIGS. 2A-C and 3A-C, the discrete reinforcing members 10 are wire meshes including a first set 12 of two or more parallel wires extending along their length L1 in a common plane P1 and a second set 14 of three parallel wires extending along their length L2 in a common plane. As used herein, the terms "extending along their length" or "extending lengthwise" in reference to the wires of the wire mesh are used to indicate that the wires lie in a plane extending along and parallel to the longitudinal axis of the wires, as opposed to, for example, a radial or diametrical plane passing orthogonally through the wires.

The first set of wires 12 and second set of wires 14 are orthogonal to each other and constitute an entire standalone reinforcing member 10, as opposed to being portions of a larger mesh. The principle behind the use of the discrete reinforcing members 10 being scattered throughout the volume of concrete is similar to the use of fibers in fiber reinforced concrete. Unlike rebar or large wire meshes, which are typically placed in a specific pattern or arrangement, the fibers in fiber reinforced concrete are dispersed randomly and scattered throughout a volume of concrete. Both rebar and fiber mesh reinforcement methods provide strength and ductility to the concrete, with slightly different advantages. Fibers generally are considered better in preventing small cracks in the concrete from becoming larger, similar to the effect of stitches on a wound, whereas rebar carries load after the concrete cracks, analogous to bones in the human body.

In a non-limiting embodiment, the wire meshes may be of a metallic material such as steel or polymeric material and formed by casting, as shown in FIGS. 2A-C. The first set of wires 12 and second set of wires 14 extend along their respective lengths L1 and L2, in a shared common plane P1. In a further non-limiting embodiment, the wire meshes are of metallic material and may be formed by welding, as shown in FIGS. 3A-C, where the first set of wires 12 extend along their length L1 in a first common plane P1 and the second set of wires 14 extend along their length L2 in a second common plane P2. The reinforcing members 10 may include a mesh pattern 16 of a total of four contiguous rectangles arranged in two rows R and two columns C.

Turning to FIG. 3D, a non-limiting example of a welding process is shown to form the reinforcing member of FIGS. 3A-C. The process begins with horizontal rows of parallel wires fed by machine, upon which are pressed vertical columns of wires contacting the rows of horizontal wires and forming intersection points. A high intensity electric current is applied at the intersection points which melts a small portion of each of the horizontal and vertical wires, and forms a strong weld after cooling. The process is repeated by pressing another vertical wire against the horizontal wires and applying an electric current. After cooling, the wires are cut into a desired mesh size, e.g. 2×1, 2×2, 3×1, 3×2, or 3×3 forming a desired number of reinforcing members. While casting and welding are methods of forming the mesh using a metallic material, it is conceivable that the reinforcing members may be formed by other manufacturing methods and materials, e.g. molding using polymer reinforced glass fiber, carbon fiber, etc.

Figure 4B:
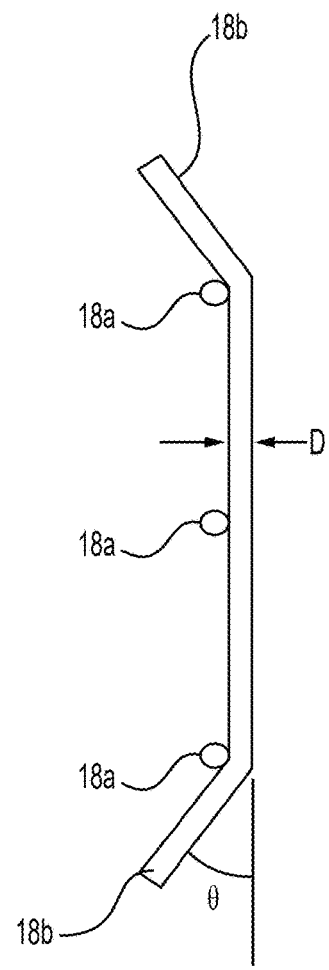
FIG. 4B is a right-side view of a 2×1 reinforcing member.
Figure 4C:
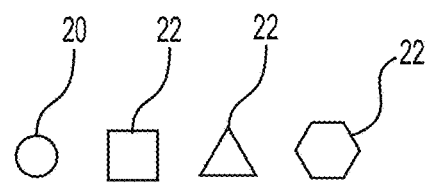
FIG. 4C are example cross sections of wires used for a reinforcing member.

Turning to FIGS. 4A-C, the fiber reinforced concrete may include reinforcing members 10 having a mesh pattern 16 including a total of two contiguous rectangles arranged in a single column C. While two rows R are shown in the embodiment of FIGS. 4A-B, a single row and two columns may be used instead. The reinforcing members 10 may include free ends 18 extending laterally outward beyond the mesh pattern 16. The free ends 18 help with increasing the anchorage of the reinforcing members within the concrete volume. Free ends 18 may include straight free ends 18a and/or bent free ends 18b, shown in FIG. 4B. Bent free ends 18b may be bent at an angle θ between 30° to 90°. While embodiments of the drawings include free ends on both the first set of wires 12 and second set of wires 14, free ends 18 may be included on only one set of wires, as well as only some wires within a set of wires.

The reinforcing members 10 may include wires having a diameter D of between about 0.2 mm and about 3 mm. In particular, the diameter D may be between about 0.2 mm and about 2 mm. An overall length L of the reinforcing members may be about 10 mm to about 75 mm and an overall width W of the reinforcing members may be about 10 mm to about 75 mm. The wires of the reinforcing members may have a cross-section which is circular 20 or polygonal 22, as shown in FIG. 4C.

Figure 5B:
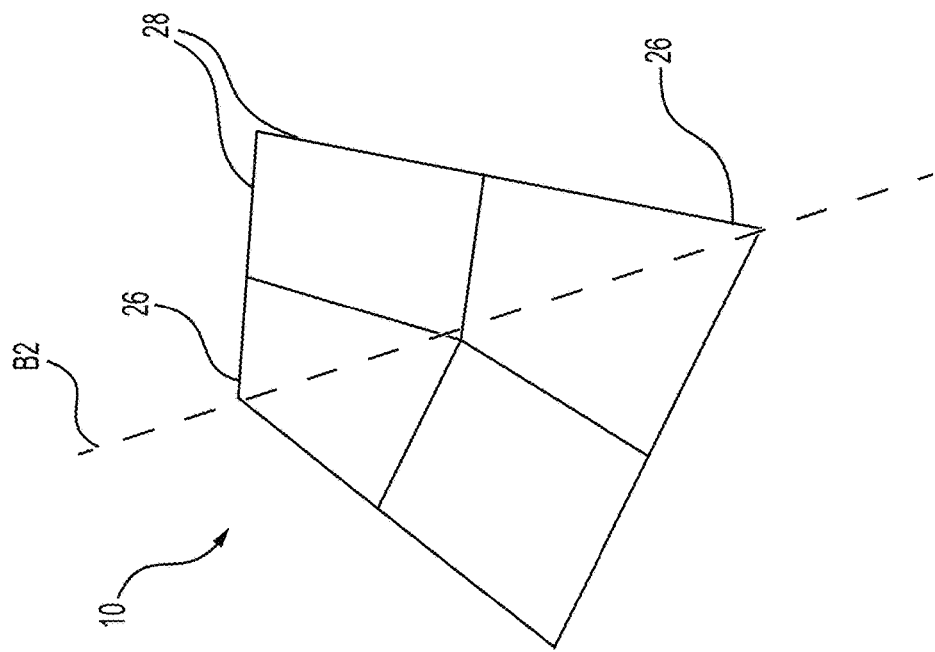
FIG. 5B is a perspective view of a reinforcing member with a diagonal bend.
Figure 5A:
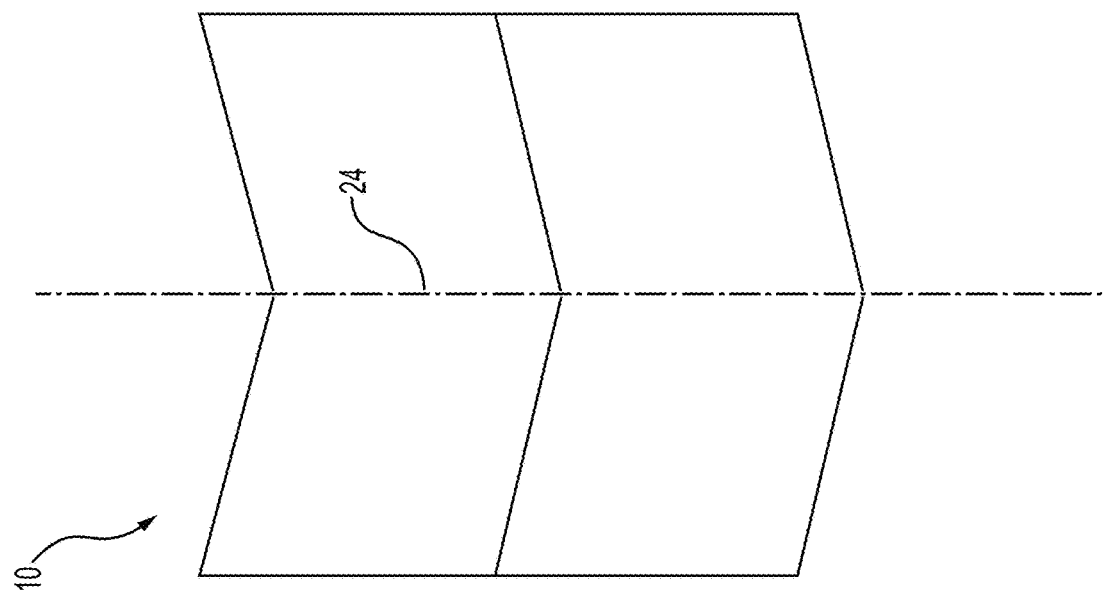
FIG. 5A is a perspective view of a reinforcing member with a central bend.

Turning to FIGS. 5A-B, in an embodiment, free ends 18 may be eliminated from reinforcing members 10 to reduce material. This avoids the wastage of fiber material in anchorages as the anchorage to one set of parallel wires is provided by the set of orthogonal wires. Reinforcing members 10 may include a "center bend" about a line B1 passing through a central wire member 24, as shown in FIG. 5A, or a "diagonal bend" about a line B2 extending through diagonally opposed corners 26 formed in a perimeter 28 of the reinforcing members. In an additional embodiment, the wires may be crimped, as shown in for example, U.S. Pat. No. 2,677,955 A, herein incorporated by reference.

Figure 6B:
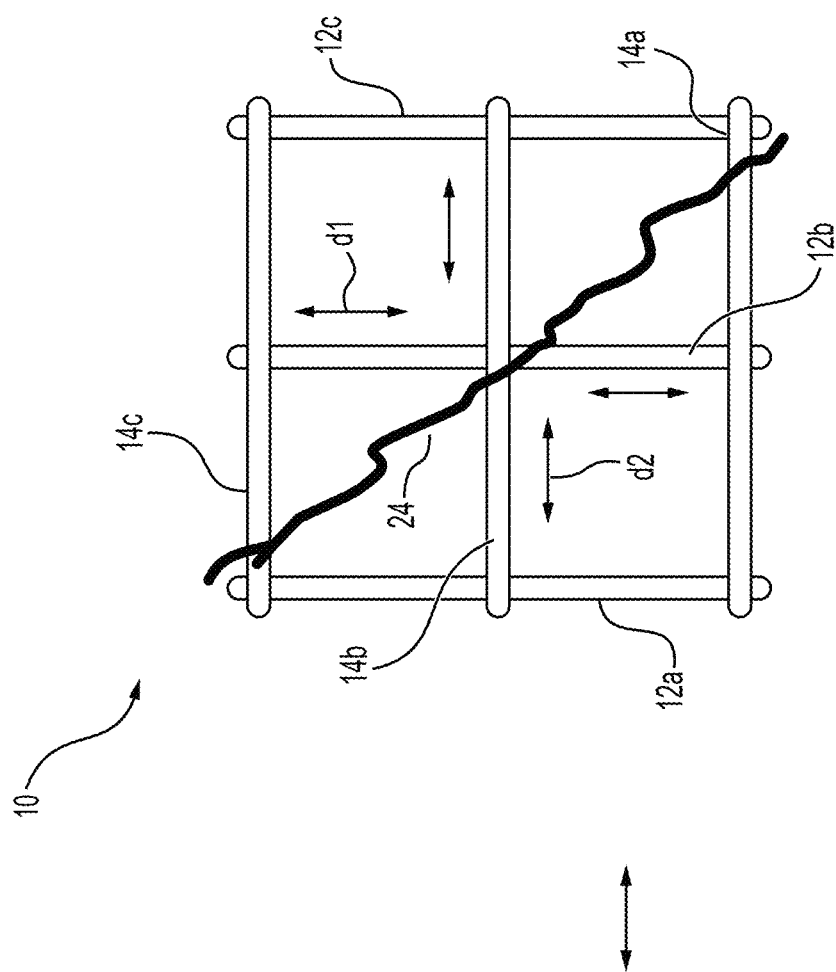
FIG. 6B is a top view of a reinforcing member without free ends providing crack resistance.
Figure 6A:
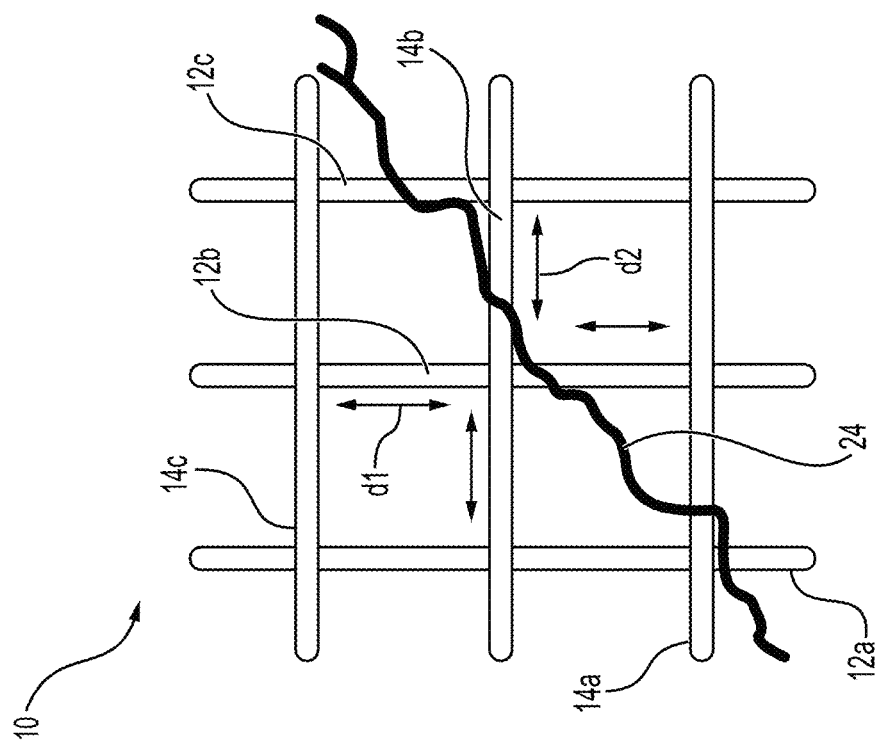
FIG. 6A is a top view of a reinforcing member with free ends providing crack resistance.

Turning to FIGS. 6A and 6B, an important advantage provided by reinforcement members 10 includes the resistance to cracks 24 in multiple directions, such as first direction d1 and second direction d2. In addition, multiple wires 14a, 14b, 14c, 12a, 12b, 12c provide resistance and anchorage against cracks 24. In FIG. 6B, transverse wires 14b, 12b provide the primary anchorage of the reinforcing member 10 in the case where free ends are not present.

Experimental Investigation

For studying the effect of using the disclosed reinforcing members on the characteristics of concrete, standard concrete cylinders (150 mm diameter×300 mm height) were tested in compression. Locally available aggregates (fine and coarse) conforming to relevant ASTM Standards (C33/C33M-2016) were used. The mix proportion of plain concrete is given in Table 1 below. Ordinary Portland cement (OPC) was used.

Fiber reinforced concrete was produced using two types of reinforcing members formed by steel wires of the same diameter (0.5 mm): (i) Straight reinforcing members of 30 mm length with hooked ends and (ii) an embodiment of the proposed reinforcing members: square wire meshes in a 2×2 mesh without free ends. Individual squares within the wire mesh were 13 mm long×13 mm wide, and thus, the total size of the mesh reinforcing members was 26 mm×26 mm. The volume of reinforcing members in concrete was 1% (i.e., 3.27% by weight). The concrete cylinders were cast of plain (having no reinforcing members) as well as the two fiber reinforced concrete types. After 28 days of curing by immersion in water, the plain and fiber reinforced concrete cylinders were tested in compression in accordance with ASTM C39/C39M-17.

TABLE 1

| Plain Concrete Mix | |
|---|---|
| Material | Weight (kg/m$^3$) |
| Cement (OPC) | 460 |
| Crushed sand | 380 |

TABLE 1-continued

Plain Concrete Mix

| Material | Weight (kg/m³) |
|---|---|
| Silica sand | 582 |
| Coarse aggregate (Nominal size = 10 mm) | 798 |
| Water (water to cement ratio = 0.40) | 184 |
| Gli-110 (Super-plasticizer) | 0.65 L |

Figure 7:
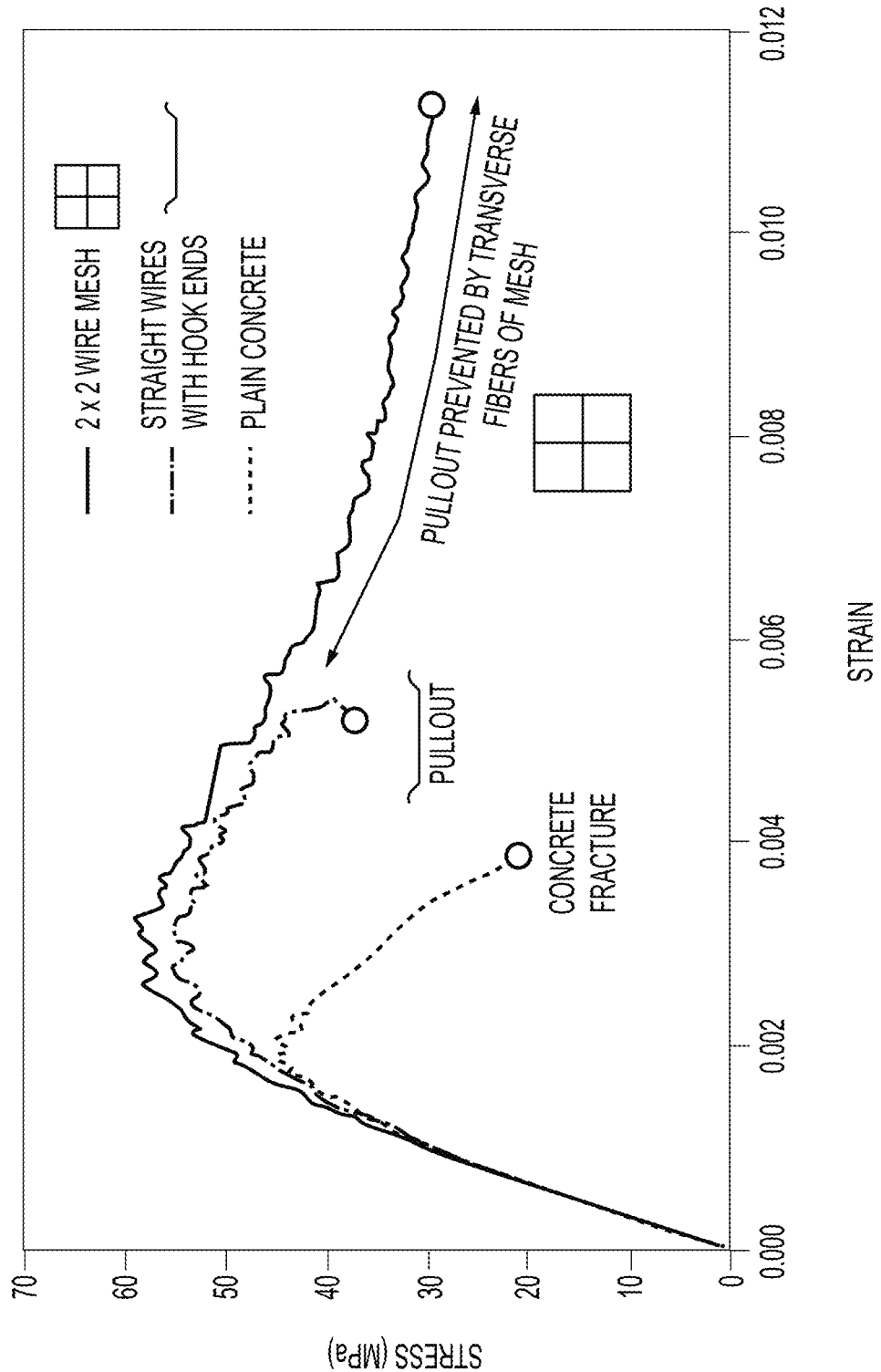
FIG. 7 is a plot showing stress-strain testing results for three types of concrete: plain, fiber reinforced concrete using straight wires with hooked ends, and fiber reinforced concrete using 2×2 wire mesh reinforcing members.

The stress-strain diagrams of the three types of concrete specimens are plotted in FIG. 7. As expected, the addition of steel wire reinforcing members increased the compressive strength and introduced ductility in the concrete. However, the increase in the compressive strength of concrete produced using the proposed wire mesh reinforcing members is due to (i) better distribution of the proposed reinforcing wires and (ii) less wastage of steel in end hooks. Moreover, the use of the proposed wire mesh reinforcing members substantially enhanced the ductility by significant extension of the post-peak portion of the stress-strain curve. Although the concrete produced using conventional hooked steel fibers failed by the pullout of the wires, the wire pullout was resisted in the concrete having mesh wire reinforcing members by the transverse wires and the final failure was when a full mesh was finally pulled from the specimen.

It is to be understood that the wire mesh concrete reinforcement members and methods of use thereof are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A concrete reinforcing member comprising:
a wire mesh including a first set of two or more parallel wires extending along their length in a common plane and a second set of three parallel wires extending along their length in a common plane, wherein the first set and second set are orthogonal to each other and constitute an entire reinforcing member, and wherein a diameter of wires in the wire mesh is about 0.2 mm to about 3 mm, an overall length of the wire mesh is about 10 mm to about 75 mm, and an overall width of the wire mesh is about 10 mm to about 75 mm,
wherein the concrete reinforcing member includes a center bend about an imaginary line passing through a central wire member from among the second set of three parallel wires.

2. A concrete reinforcing member comprising:
a wire mesh including a first set of two or more parallel wires extending along their length in a common plane and a second set of three parallel wires extending along their length in a common plane, wherein the first set and second set are orthogonal to each other and constitute an entire reinforcing member, and wherein a diameter of wires in the wire mesh is about 0.2 mm to about 3 mm, an overall length of the wire mesh is about 10 mm to about 75 mm, and an overall width of the wire mesh is about 10 mm to about 75 mm,
wherein the first set of two or more parallel wires and the second set of three parallel wires define a perimeter of the concrete reinforcement member, and
wherein the concrete reinforcing member includes a diagonal bend about an imaginary line extending through diagonally opposed corners formed in the perimeter thereof.

* * * * *